G. M. RICHARDS.
LOAD CONTROLLING DEVICE.
APPLICATION FILED OCT. 18, 1911.
1,062,665.
Patented May 27, 1913.
2 SHEETS—SHEET 1.
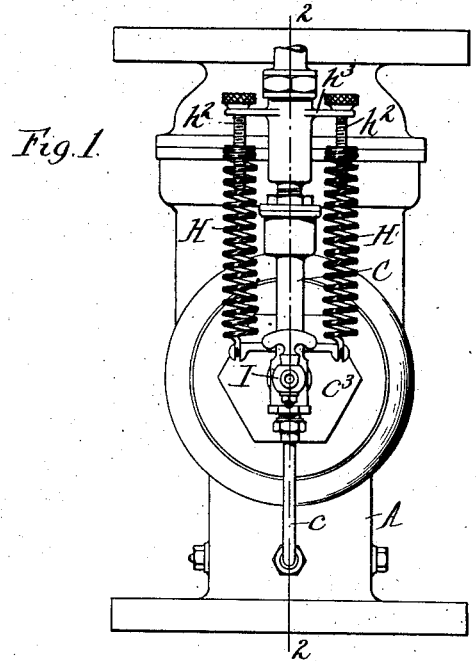
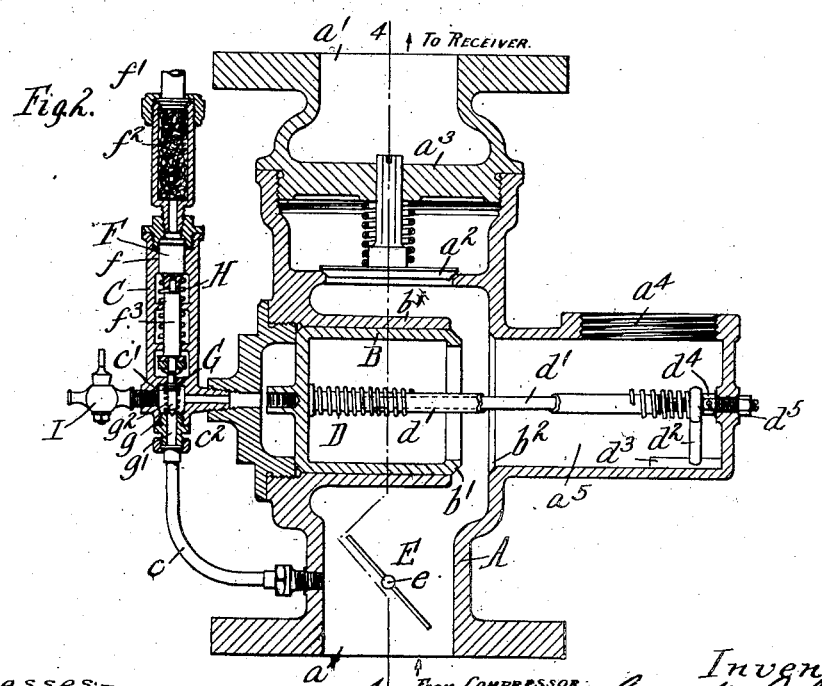

G. M. RICHARDS.
LOAD CONTROLLING DEVICE.
APPLICATION FILED OCT. 18, 1911.
1,062,665.
Patented May 27, 1913.
2 SHEETS—SHEET 2.
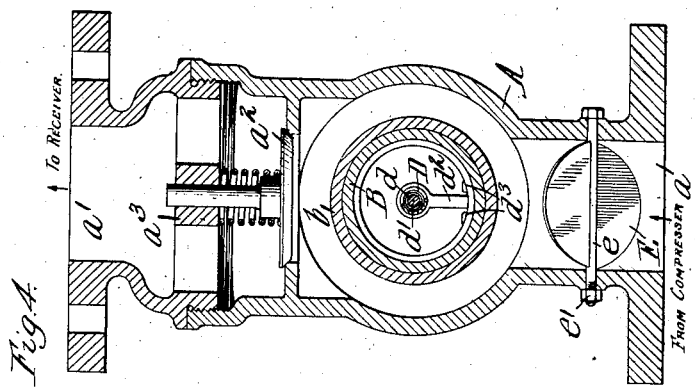
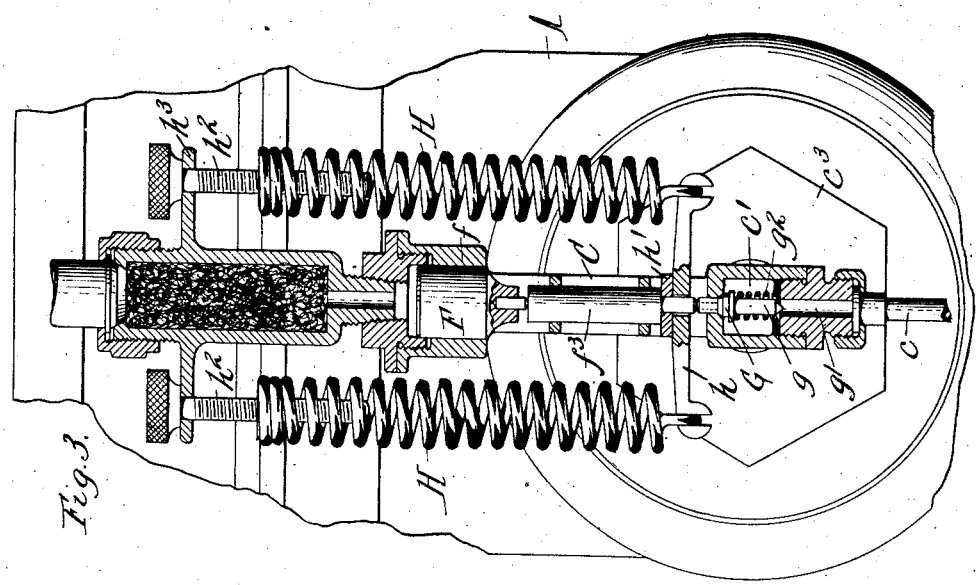
Witnesses:—
Alfred Bakenhagen.
F. E. Prochnow.
Inventor.
George M. Richards,
By Wilhelm, Parker & Hard,
Attorneys.

UNITED STATES PATENT OFFICE.

GEORGE M. RICHARDS, OF ERIE, PENNSYLVANIA.

LOAD-CONTROLLING DEVICE.

1,062,665. Specification of Letters Patent. Patented May 27, 1913.

Application filed October 18, 1911. Serial No. 655,272.

*To all whom it may concern:*

Be it known that I, GEORGE M. RICHARDS, a citizen of the United States, residing at Erie, in the county of Erie and State of Pennsylvania, have invented a new and useful Improvement in Load-Controlling Devices, of which the following is a specification.

This invention relates to load controlling devices which are used in connection with fluid compressors or pumps for permitting the machine to start without load and for automatically loading the machine after the same reaches the desired speed, and for controlling the pressure of the pumped fluid while the machine is running.

The device is primarily intended for use on motor driven compressors, but is adapted for use with other types of compressors.

In starting a fluid compressor or pump, especially one which is driven by an electric or other motor having a low starting torque, it is desirable to have the machine unloaded until it attains nearly its normal running speed, after which the load can be applied, and also to unload the machine when the pressure of the pumped fluid in the receiver reaches a desired maximum.

The objects of this invention are to provide a load controlling device which will automatically load the machine after the desired speed has been attained and which will unload the machine when the pressure of the pumped fluid reaches the desired maximum; also to produce a device of this kind which is simple in construction and reliable in operation and which is readily adjustable to adapt the device to operate under various different conditions; also to provide means by which the machine, while in operation, can be unloaded at any time.

In the accompanying drawings consisting of two sheets: Figure 1 is an elevation of an unloading device embodying the invention. Fig. 2 is a sectional elevation thereof on line 2—2, Fig. 1. Fig. 3 is a fragmentary sectional elevation thereof on an enlarged scale, on line 3—3, Fig. 2. Fig. 4 is a sectional elevation thereof on line 4—4, Fig. 2.

Like reference characters refer to like parts in the several figures.

The load controller forming the subject of this invention is especially suited for use on air compressors, and the word "air" will be hereinafter used to designate the pumped fluid, but it is not intended thereby to limit the invention to air compressors.

A represents the casing of the load controlling device, which may be of any suitable construction and which has an inlet opening $a$ through which the air from the compressor enters the casing, and an outlet opening $a'$, through which the air passes to receiver or discharge pipes of the system. The outlet opening $a'$ is preferably controlled by a suitable check valve $a^2$ for retaining the pressure in the receiver or discharge pipe. The check valve shown has a stem which is guided in a cross bar $a^3$, extending across the outlet connection of the casing. The casing is also provided, between its air inlet and outlet openings, with a suitable escape or exhaust opening $a^4$ leading to the atmosphere. In the construction shown, the casing is provided with a lateral extension $a^5$, in which the escape opening $a^4$ is formed. When the air is allowed to pass from the compressor through the escape opening to the atmosphere, the machine is unloaded, and in order to load the machine, it is necessary to close the discharge opening.

The means employed for opening and closing the escape opening, in the construction shown in the drawings, comprises a load controlling valve or piston B, which is arranged to slide in a cylinder or hollow cylindrical portion $b$ of the casing A extending inwardly toward the escape extension $a^5$ of the casing from the opposite side of the casing. The valve B is cylindrical in shape and is provided at one end with a beveled face $b'$, which is adapted to seat against a corresponding face $b^2$ surrounding the inner end of the escape extension $a^5$ of the valve casing. When the valve is seated, the air cannot pass through the extension $a^5$ and through the escape opening $a^4$ and, therefore, passes around the cylindrical portion $b$ of the casing and past the check valve $a^2$ to the receiver. The valve B is adapted to be seated by air pressure acting on the inner end of the valve in the valve cylinder $b$. Air is admitted to the cylinder $b$ for actuating the load controlling valve B by a suitable by-pass or passage connecting the inner end of the cylinder with the inlet end of the casing A. In the construction shown, this bypass consists of a pipe $c$ leading from the inlet connection of the casing A to a valve chamber $c'$ which connects by a passage $c^2$ with the valve cylinder $b$. This valve chamber is formed in the lower end of a casing or frame C which is fixed to the casing A, for instance by a threaded nipple $c^3$ screwed into a hole in the casing A. The movement of the load controlling valve by the air pressure is opposed by a suitable spring D which operates to unseat the valve when the pressure in the cylinder $b$ drops below a predetermined point. In the construction shown, this spring surrounds a tubular stem $d$ which is preferably rigidly secured to the valve B and slides on a rod $d'$ secured in the extension $a^5$ of the casing A. The outer end of the spring bears against a dog $d^2$ which has a screw threaded engagement with a threaded portion of the rod $d'$, and is held from turning by two beads or ribs $d^3$ formed in the extension $a^5$ of the casing A. The rod $d'$ projects loosely through a hole in the extension $a^5$ and a collar or nut $d^4$, secured to the rod, limits the outward movement of the rod. The outer end of the rod is slotted or otherwise fashioned to receive a suitable tool for turning it and is provided with a lock nut $d^5$ for holding it when adjusted. By turning the rod, the dog $d^2$ can be moved toward or from the valve B, thereby regulating the compression of the spring. By means of this adjustment, the valve B can be made to seat and load the machine at various different pressures of air acting thereon.

When the compressor is started, the parts of the load controlling device are in the positions shown in the drawings, and the air from the compressor passes through the escape opening $a^4$ to the atmosphere. As the speed of the machine increases the quantity of air pumped through the casing A increases and the resistance to the flow of air through the casing causes the air in the air inlet opening of the casing to be under greater pressure than air at the escape opening adjacent to the valve B. The pressure at the inlet opening is communicated to the valve B through the by-pass $c$ leading to the valve cylinder $b$, and when this pressure is sufficient it moves the valve B to its seat against the action of the spring D, thereby closing the escape opening and causing the air to pass to the receiver. The machine is thus loaded.

Suitable means are preferably provided for producing a difference between the pressure at the inlet opening and the atmospheric pressure acting on the outer face of the valve B, and for effecting variations in this difference of pressures to cause the valve to operate to load the machine at one or another speed. A butterfly valve or damper E is shown in the drawings for this purpose, located in the inlet connection of the casing A and secured to a pin $e$, pivoted in the casing. The pin $e$ preferably extends out of the casing to permit the damper to be adjusted, and is provided with a lock nut $e'$ whereby the damper can be set in any desired position. The pressure in the inlet connection of the casing A and in the valve cylinder $b$ can be varied for a given speed of the compressor by adjusting the damper E to more or less obstruct the inlet connection. Since the pressure in the inlet connection of the casing and the valve cylinder $b$ varies with changes in the speed of the compressor, the speed at which the machine is to be loaded can be controlled either by an appropriate adjustment of the damper E or of the spring D for the valve B.

The means for unloading the compressor when the pressure in the receiver reaches a predetermined maximum are constructed as follows: The upper part of the casing or frame C is provided with a cylinder $f$ in which a piston F is adapted to slide. The air from the receiver is conducted to the upper part of the cylinder $f$ through a pipe $f'$, a suitable filter $f^2$ being preferably inserted between the receiver and the cylinder. The downward movement of the piston F, due to the pressure in the cylinder $f$, is transmitted through a rod $f^3$, slidably mounted in the casing C, to a suitable relief valve G which controls a hole in the upper end of the valve chamber $c'$, through which the pressure in this chamber and the cylinder $b$ of the load controlling valve B can be relieved when the relief valve is opened. The relief valve shown is provided with a stem which projects through the relief hole in the valve chamber and is grooved or otherwise shaped to allow the escape of air through the relief hole, and with a downwardly projecting portion $g$ which is adapted to close the hole or passage $g'$ in the chamber $c'$ with which the by-pass pipe $c$ connects, thereby shutting off the admission of air to the valve chamber $c'$ and the cylinder $b$ of the load controlling valve B from the inlet opening $a$ of the casing A. When the air is discharged from the chamber $c'$ and the cylinder $b$, which is connected therewith, the load controlling valve B will be moved off its seat by the spring D, and by the pressure acting on the seat end of the valve, thus allowing the air from the compressor to discharge to the atmosphere through the escape opening $a^4$ and unloading the machine. A spring $g^2$ is provided to again seat the relief valve G when the piston F is returned to its normal position.

Any suitable means may be used to oppose the movement of the piston F, those shown in the drawings comprising two springs H, which are secured at one end to a yoke $h$ which bears against a collar $h'$ seated on the lower end of the rod $f^3$. The other ends of the springs have screw connections with suitable adjusting screws $h^2$ which bear on arms $h^3$ projecting from the casing C. By means of the screws $h^2$ the tension of the springs H can be adjusted to cause the piston F to be moved to open the relief valve G by a greater or less pressure of air in the receiver.

I represents a small vent cock which can be opened by hand to discharge air from the relief valve chamber $c'$ at any time during the operation of the compressor and thereby effect the unloading of the machine.

The device described is simple and reliable in operation and is so constructed that all of the parts thereof are readily accessible and that the device can be adjusted to operate at any desired pressure and to load the machine at any speed.

I claim as my invention:

1. In a load controlling device for fluid compressors, the combination of a casing having inlet and outlet portions which connect respectively with the compressor and with a receiver for the compressed fluid, and an escape opening, a check valve located between the escape opening and the receiver for retaining the pressure in the receiver, a valve cylinder located in said casing between said inlet and outlet openings, a load controlling valve located in said cylinder and adapted to open and close said escape opening, a by-pass adapted to transmit fluid pressure from the inlet portion of said casing to said cylinder, whereby the difference between the fluid pressures in the inlet portion and the escape opening of the casing is transmitted to said cylinder to move said controlling valve to close said escape opening, and means for returning the controlling valve when the pressure in said cylinder is reduced, substantially as set forth.

2. In a load controlling device for fluid compressors, the combination of a casing having inlet and outlet portions which connect respectively with the compressor and with a receiver for the compressed fluid, and an escape opening located between said inlet and outlet portions, a valve cylinder located in said casing between said inlet and outlet openings, a load controlling valve located in said cylinder and adapted to open and close said escape opening, said valve being yieldingly held in its open position, and a by-pass leading from the inlet portion of the casing to said cylinder, whereby fluid pressure from said inlet portion is transmitted to said cylinder to move said controlling valve to close said escape opening, substantially as set forth.

3. In a load controlling device for fluid compressors, the combination of a casing having inlet and outlet portions which connect respectively with the compressor and with a receiver for the compressed fluid, and an escape opening, a check valve located between the escape opening and the receiver for retaining the pressure in the receiver, a valve cylinder located in said casing between said inlet and outlet openings, a load controlling valve located in said cylinder and adapted to open and close said escape opening, a by-pass adapted to transmit fluid pressure from the inlet portion of said casing to said cylinder, whereby the difference between the fluid pressures in the inlet portion and the escape opening of the casing is transmitted to said cylinder to move said controlling valve to close said escape opening, a device located in said casing and adapted to be adjusted to regulate the pressure in the inlet portion, substantially as set forth.

4. In a load controlling device for fluid compressors, the combination of a casing having inlet and outlet portions which connect respectively with the compressor and with a receiver for the compressed fluid, and an escape opening located between said inlet and outlet portions, a check valve located between the escape opening and the receiver for retaining the pressure in the receiver, a valve cylinder located in said casing between said inlet and outlet openings, a load controlling valve located in said cylinder and adapted to open and close said escape opening, a by-pass leading from the inlet portion of said casing to said cylinder, whereby fluid pressure from said inlet portion is transmitted to said cylinder to move said controlling valve to close said escape opening, a spring in said casing for returning the controlling valve when the pressure in the cylinder portion is reduced, and means adjustable exteriorly of said casing for regulating the pressure of said spring, substantially as set forth.

5. In a load controlling device for fluid compressors, the combination of a casing having inlet and outlet portions which respectively connect with the compressor and with a receiver, and an escape opening located between said inlet and outlet portions, a valve movable in a cylinder to open or close said escape opening, a connection between said cylinder and said inlet portion of the casing, whereby the difference between the fluid pressures in the inlet portion and the escape opening of the casing is transmitted to said cylinder to move said valve to close said escape opening, and means actuated by the pressure of the pumped fluid for discharging the fluid from said cylinder to cause said valve to open said escape opening, substantially as set forth.

6. In a load controlling device for fluid compressors, the combination of a casing having an inlet portion which connects with the compressor, an outlet portion leading to a receiver and an escape opening, a check valve located between the escape opening and the receiver for retaining the pressure in the receiver, a load controlling valve located in said casing between said inlet and outlet portions and adapted to open and close said escape opening, means for transmitting the pressure of the pumped fluid to said controlling valve to move said valve to close said escape opening, means for returning the valve, and means controlled by the pressure of the pumped fluid in the receiver for reducing the pressure acting on said controlling valve to cause the controlling valve to be moved to open said escape opening, substantially as set forth.

7. In a load controlling device for fluid compressors, the combination of a casing having an inlet portion which connects with the compressor, an escape opening and an outlet opening leading to a receiver, a load controlling valve movable in a cylinder to open and close said escape opening, a connection between said cylinder and said inlet portions of the casing, whereby the pressure of the fluid at the inlet portion is transmitted to said cylinder to move said valve to close said escape opening, means for returning the valve to open said escape opening, a relief valve for discharging the fluid from said cylinder, and means actuated by the fluid from the receiver for operating said relief valve, substantially as set forth.

8. In a load controlling device for fluid compressors, the combination of a casing having inlet and outlet portions which respectively connect with the compressor and with a receiver, and an escape opening, a valve movable in a cylinder to open or close said escape opening, a connection between said cylinder and said inlet portion of the casing, whereby the pressure of the fluid at the inlet portion is transmitted to said cylinder to move said valve to close said escape opening, and a vent cock for discharging the fluid from said cylinder to cause said valve to open said escape opening, substantially as set forth.

9. In a load controlling device for fluid compressors, the combination of a casing having an inlet portion which connects with the compressor, an escape opening, and an outlet opening leading to a receiver, a load controlling valve movable in a cylinder to open and close said escape opening, a connection between said cylinder and said inlet portions of the casing, whereby the pressure of the fluid to the inlet portion is transmitted to said cylinder to move said valve to close said escape opening, means for returning the valve to open said escape opening, a relief valve for discharging the fluid from said cylinder, means actuated by the fluid from the receiver for operating said relief valve, and a vent cock for relieving the pressure in said valve cylinder to cause said valve to open said escape opening at will, substantially as set forth.

10. In a load controlling device for fluid compressors, the combination of a casing having inlet and outlet openings, which connect respectively with the compressor and with a receiver for the compressed fluid, and an escape opening, a check valve located between the escape opening and the receiver, a valve cylinder located in said casing between said inlet and outlet portions and extending inwardly from one side of said casing adjacent to said escape opening and which is open at its inner end, a load controlling valve slidably arranged in said cylinder and having a portion which is adapted to coöperate with a valve seat in said casing to open and close said escape opening, a by-pass leading from the inlet portion of said casing to said cylinder, whereby fluid pressure from said inlet portion is transmitted to said cylinder to move said controlling valve to close said escape opening, and means for returning the controlling valve when the pressure in said cylinder is reduced, substantially as set forth.

11. In a load controlling device for fluid compressors, the combination of a casing having inlet and outlet portions which connect respectively with the compressor and with a receiver for the compressed fluid, and an escape opening, a check valve located between the escape opening and the receiver for retaining the pressure in the receiver, a valve cylinder located in said casing between said inlet and outlet openings, a load controlling valve located in said cylinder and adapted to open and close said escape opening, a relief valve chamber connected with said cylinder, and a connection between the inlet portion of said casing and said relief valve chamber, whereby fluid pressure from said inlet portion is transmitted to said cylinder to move said controlling valve to close said escape opening, and a relief valve actuated by the pressure in the receiver for discharging the fluid from said cylinder and for closing said connection between said inlet portion and the valve chamber, substantially as set forth.

12. In a load controlling device for fluid compressors, the combination of a casing having inlet and outlet portions which connect respectively with the compressor and with a receiver for the compressed fluid, and an escape opening, said casing having a lateral extension in which said escape opening is formed, a valve adapted to engage with a valve seat surrounding the inner end of said lateral extension, a valve cylinder in which said valve is adapted to slide, a by-pass leading from the inlet portion of the casing to the cylinder for transmitting fluid pressure from said inlet portion to the cylinder for seating said valve, a spring extending into said lateral extension for unseating said valve, and means operable exterior of said casing for adjusting the compression of the spring, substantially as set forth.

Witness my hand this 16th day of October, 1911.

GEORGE M. RICHARDS.

Witnesses:
MARION A. RICHARDS,
LENA M. PAASCH.